(No Model.)
F. H. TURNURE.
HORSE TAIL HOLDER.
No. 336,359. Patented Feb. 16, 1886.
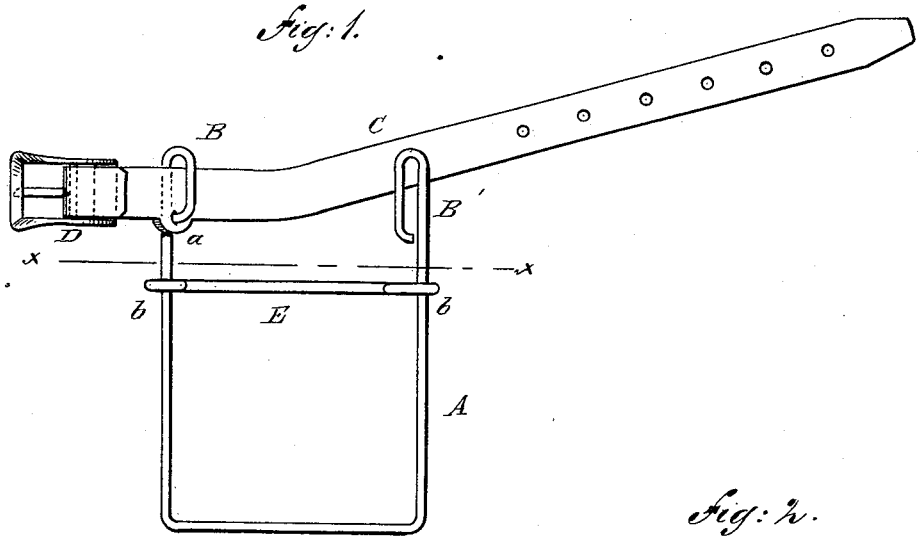
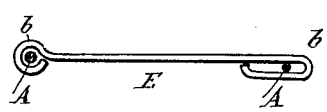
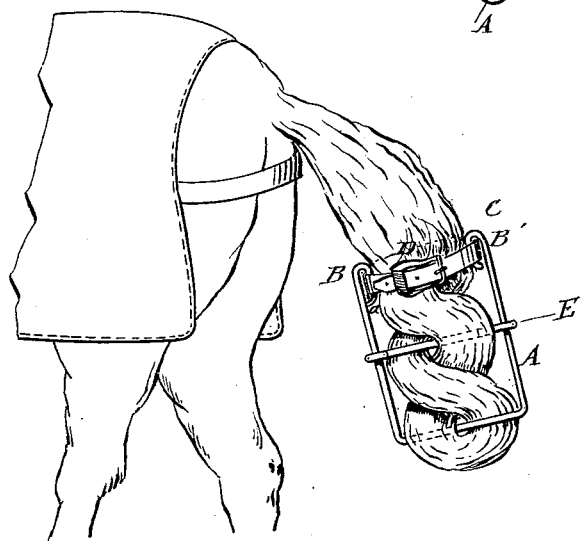
WITNESSES:
Chas. Nida
C. Sedgwick
INVENTOR:
F. H. Turnure
BY Munn & Co
ATTORNEYS.

UNITED STATES PATENT OFFICE.

FRANK H. TURNURE, OF GRAHAM, MISSOURI.

HORSE-TAIL HOLDER.

SPECIFICATION forming part of Letters Patent No. 336,359, dated February 16, 1886.

Application filed November 27, 1885. Serial No. 184,100. (No model.)

*To all whom it may concern:*

Be it known that I, FRANK H. TURNURE, of Graham, in the county of Nodaway and State of Missouri, have invented a new and useful Improvement in Horse-Tail Holders, of which the following is a specification, reference being had to the annexed drawings, forming a part thereof, in which—

Figure 1 is a side elevation. Fig. 2 is a transverse section taken on line $x$ $x$ in Fig. 1. Fig. 3 shows the application of my improved horse-tail holder.

Similar letters of reference indicate corresponding parts in the different figures of the drawings.

The object of my invention is to provide an efficient and simple device for holding the tails of horses and other animals, to keep them in good order and to prevent them from becoming covered with mud.

My invention consists in a frame provided with a movable cross-bar, and having a strap and buckle, and adapted to receive the bushy end of the horse's tail and hold it in a compact but easily-released knot.

The body of the holder consists of a frame, A, formed of a wire bent twice at right angles, with the two arms thereof arranged parallel with each other. Upon the end of the arms are formed oblong loops B B' for receiving the strap C. The strap C is provided with an eye, $a$, for receiving the end of the wire forming the loop B, so as to prevent the strap from sliding through the loop. One end of the strap is provided with an ordinary buckle, D, and the opposite end of the strap is perforated to receive the tongue of the buckle D. A cross-bar, E, extends across the body A of the holder, and is provided with eyes $b$ at opposite ends, which encircle the arms of the frame A, and which may be freely moved along the arms of the frame.

My improved device is applied to the tail of a horse by first drawing up the cross-bar E to a point near the oblong loops B and B'. The strap C is removed from the loop B', and the horse's tail is passed through the rectangular opening formed between the cross-bar E and the sides of the frame of the holder, and wound once or twice around the lower part of the frame, when the cross-bar is pushed down into the position shown in Fig. 3, and the bushy part of the horse's tail is bent back upon itself and wound around itself above the cross-bar, when the free end of the strap C is inserted in the loop B' and buckled around the horse's tail, as shown in Fig. 3.

The holder, being made of wire, is very light and is not noticed by the animal. It may be readily applied and is easily removed.

Having thus described my invention, what I claim as new, and desire to secure by Letters Patent, is—

1. In a tail-holder for horses and other animals, the wire frame A, having parallel arms and loops B B' formed on the ends thereof, a cross-bar, E, and the strap C, in combination, as herein specified.

2. As an improved article of manufacture, a horse-tail holder consisting of a wire frame, A, having parallel arms with oblong loops formed on the ends thereof, a cross-bar, E, arranged to slide upon the parallel arms of the frame, and a strap, C, provided with an eye, $a$, and having upon one end a buckle, D, as herein specified.

FRANK H. TURNURE.

Witnesses:
P. J. BARRON,
J. C. SWANK.